(12) United States Patent
Abed

(10) Patent No.: US 11,991,405 B2
(45) Date of Patent: *May 21, 2024

(54) SYSTEMS AND METHODS FOR AUTOMATED EXTRACTION OF CLOSED CAPTIONS IN REAL TIME OR NEAR REAL-TIME AND TAGGING OF STREAMING DATA FOR ADVERTISEMENTS

(71) Applicant: Crossbar Media Group, Inc, Chapel Hill, NC (US)

(72) Inventor: Samir Abed, Chapel Hill, NC (US)

(73) Assignee: CROSSBAR MEDIA GROUP, INC, Chapel Hill, NC (US)

( * ) Notice: Subject to any disclaimer, the term of this patent is extended or adjusted under 35 U.S.C. 154(b) by 740 days.

This patent is subject to a terminal disclaimer.

(21) Appl. No.: 16/656,091

(22) Filed: Oct. 17, 2019

(65) Prior Publication Data
US 2020/0053409 A1    Feb. 13, 2020

Related U.S. Application Data

(63) Continuation-in-part of application No. 16/170,944, filed on Oct. 25, 2018, now Pat. No. 10,455,269, (Continued)

(51) Int. Cl.
*H04N 21/2668* (2011.01)
*G06F 16/783* (2019.01)
(Continued)

(52) U.S. Cl.
CPC ..... *H04N 21/2668* (2013.01); *G06F 16/7844* (2019.01); *H04H 60/375* (2013.01); *H04H 60/48* (2013.01); *H04N 7/0882* (2013.01); *H04N 21/2181* (2013.01); *H04N 21/233* (2013.01); *H04N 21/23418* (2013.01); *H04N 21/2353* (2013.01); *H04N 21/25883* (2013.01); *H04N 21/25891* (2013.01); *H04N 21/4332* (2013.01); *H04N 21/4334* (2013.01); *H04N 21/4348* (2013.01); *H04N 21/4394* (2013.01); *H04N 21/4398* (2013.01); *H04N 21/440236* (2013.01); *H04N 21/4828* (2013.01);
(Continued)

(58) Field of Classification Search
None
See application file for complete search history.

(56) References Cited

U.S. PATENT DOCUMENTS 5,481,296 A    1/1996 Cragun et al.
6,295,092 B1   9/2001 Hullinger et al.
(Continued)

*Primary Examiner* — Jason K Lin
(74) *Attorney, Agent, or Firm* — NEO IP

(57) ABSTRACT

System and methods for finding and analyzing targeted content from audio and video content sources, including means and methods for extracting captions from audio and video content sources; searching the captions for a mention of at least one target; extracting audio and video segments relating to the at least one target; delivering extracted audio and video segments to a user device; harvesting social media data relevant to the at least one target; analyzing the search results in correlation with the social media data for target content.

20 Claims, 12 Drawing Sheets

Related U.S. Application Data which is a continuation-in-part of application No. 15/456,155, filed on Mar. 10, 2017, now Pat. No. 10,116,982, which is a continuation-in-part of application No. 15/049,376, filed on Feb. 22, 2016, now Pat. No. 9,602,855, which is a continuation of application No. 14/711,257, filed on May 13, 2015, now Pat. No. 9,282,350, which is a continuation of application No. 14/299,833, filed on Jun. 9, 2014, now Pat. No. 9,055,344, which is a continuation of application No. 13/834,290, filed on Mar. 15, 2013, now Pat. No. 8,763,067, which is a continuation-in-part of application No. 12/967,135, filed on Dec. 14, 2010, now Pat. No. 8,424,052.

(60) Provisional application No. 61/287,868, filed on Dec. 18, 2009.

(51) Int. Cl.
*H04H 60/37* (2008.01)
*H04H 60/48* (2008.01)
*H04N 7/088* (2006.01)
*H04N 21/218* (2011.01)
*H04N 21/233* (2011.01)
*H04N 21/234* (2011.01)
*H04N 21/235* (2011.01)
*H04N 21/258* (2011.01)
*H04N 21/433* (2011.01)
*H04N 21/434* (2011.01)
*H04N 21/439* (2011.01)
*H04N 21/4402* (2011.01)
*H04N 21/482* (2011.01)
*H04N 21/488* (2011.01)
*H04N 21/81* (2011.01)
*H04N 21/8352* (2011.01)
*H04N 21/845* (2011.01)
*H04N 21/858* (2011.01)

(52) U.S. Cl.
CPC ..... *H04N 21/4882* (2013.01); *H04N 21/4888* (2013.01); *H04N 21/812* (2013.01); *H04N 21/8352* (2013.01); *H04N 21/8456* (2013.01); *H04N 21/858* (2013.01)

(56) References Cited

U.S. PATENT DOCUMENTS

| | | | |
|---|---|---|---|
| 6,810,526 B1 | 10/2004 | Menard et al. | |
| 8,209,713 B1* | 6/2012 | Lai | H04N 21/6405 |
| | | | 725/18 |
| 8,424,052 B2 | 4/2013 | Abed | |
| 9,055,344 B2 | 6/2015 | Abed | |
| 9,282,350 B2 | 3/2016 | Abed | |
| 9,602,855 B2 | 3/2017 | Abed | |
| 9,946,712 B2* | 4/2018 | Shen | H04N 21/4884 |
| 10,116,982 B2 | 10/2018 | Abed | |
| 2002/0091764 A1* | 7/2002 | Yale | H04N 21/6175 |
| | | | 725/87 |
| 2003/0110515 A1* | 6/2003 | Satoda | H04N 21/234363 |
| | | | 725/143 |
| 2007/0204285 A1* | 8/2007 | Louw | H04N 21/4667 |
| | | | 348/E7.07 |
| 2008/0086754 A1* | 4/2008 | Chen | H04N 21/4532 |
| | | | 348/E7.071 |
| 2009/0157511 A1* | 6/2009 | Spinnell | G06Q 90/00 |
| | | | 705/14.1 |
| 2010/0115060 A1* | 5/2010 | Julia | G06F 16/9535 |
| | | | 709/219 |
| 2010/0125882 A1* | 5/2010 | Athias | H04N 21/812 |
| | | | 725/88 |
| 2010/0162338 A1 | 6/2010 | Makhija et al. | |
| 2010/0195974 A1* | 8/2010 | Zheng | H04N 21/6587 |
| | | | 386/343 |
| 2011/0047567 A1 | 2/2011 | Zigmond et al. | |
| 2011/0135283 A1* | 6/2011 | Poniatowki | H04N 21/812 |
| | | | 725/39 |
| 2011/0314485 A1* | 12/2011 | Abed | H04N 21/4332 |
| | | | 348/E7.001 |
| 2012/0210348 A1* | 8/2012 | Verna | H04N 21/2665 |
| | | | 386/338 |
| 2015/0095320 A1* | 4/2015 | Motte | G06F 16/285 |
| | | | 707/723 |
| 2017/0188070 A1* | 6/2017 | Abed | H04N 21/4348 |
| 2018/0130075 A1* | 5/2018 | Roy | H04N 21/4756 |
| 2019/0069013 A1 | 2/2019 | Abed | |
| 2020/0090143 A1* | 3/2020 | Iervolino | H04L 63/12 |

\* cited by examiner

Figure 8

SYSTEMS AND METHODS FOR AUTOMATED EXTRACTION OF CLOSED CAPTIONS IN REAL TIME OR NEAR REAL-TIME AND TAGGING OF STREAMING DATA FOR ADVERTISEMENTS

A portion of the disclosure of this patent document contains material which is subject to (copyright or mask work) protection. The (copyright or mask work) owner has no objection to the facsimile reproduction by anyone of the patent document or the patent disclosure, as it appears in the Patent and Trademark Office patent file or records, but otherwise reserves all (copyright or mask work) rights whatsoever.

CROSS-REFERENCE TO RELATED APPLICATIONS

This application relates to and claims priority from the following U.S. applications. This application is a continuation-in-part of U.S. application Ser. No. 16/170,944 filed Oct. 25, 2018, which is a continuation-in-part of U.S. application Ser. No. 15/456,155 filed Mar. 10, 2017, which is a continuation-in-part of U.S. application Ser. No. 15/049,376 filed Feb. 22, 2016, which is a continuation of U.S. application Ser. No. 14/711,257 filed on May 13, 2015, which is a continuation of U.S. application Ser. No. 14/299,833 filed on Jun. 9, 2014, which is a continuation of U.S. application Ser. No. 13/834,290 filed on Mar. 15, 2013, which is a continuation-in-part of U.S. application Ser. No. 12/967,135 filed on Dec. 14, 2010, which claims the benefit of U.S. Application No. 61/287,868 filed on Dec. 18, 2009, each of which is incorporated herein by reference in its entirety.

BACKGROUND OF THE INVENTION

1. Field of the Invention

The present invention relates generally to electronic data streaming management. Further, the present invention relates to automated real time or near real time extraction of closed captions systems and methods relating thereto, and more particularly to advertisement video closed captioning. Near real-time extraction is extraction that is initiated during the broadcast whereas real-time extraction has no time delay.

2. Description of the Prior Art

Many TV broadcasts and owners of video content enable users to see complete segments of a TV program or partial segments of a TV program. While this is usually sufficient for an individual with access to a high speed device, the individual can only 'see' and 'listen' to one channel at a time and sometimes to several. There is no ability for an individual or organization to monitor in real time dozens or hundreds of TV channels for particular keywords, concepts or phrases (words of interest (WOI)) and be alerted of the occurrence of those words, browse for WOI, search to any WOI and persist the WOI over a long period of time. Further, there is a need to be able to deliver the WOI over a lower speed network, such as a telephone provider's network, in increasing bandwidth without clogging the network infrastructure.

There also remains a need for automated systems and methods for encoding and embedding tag(s) associated with data streams for providing search capability of the data streams.

Relevant prior art U.S. patents and published pending U.S. patent applications include the following:

U.S. Pat. Nos. 5,859,662, 5,481,296, 6,266,094 and U.S. Pub. Nos. 2008/0313146 and 2003/0221198 relate to extracting captions from video broadcasts.

U.S. Pat. No. 5,859,662 and U.S. Pub. No. 2009/0049481 relate to extracting captions in real time.

U.S. Pat. No. 7,518,657 relates to storing captions on a device or pushing to a cloud.

U.S. Pat. Nos. 5,859,662 and 6,266,094 relate to providing alerts based upon key words.

U.S. Pat. No. 5,481,296 relates to providing alerts based upon concepts of interest.

U.S. Pat. Nos. 6,580,437 and 6,798,912 relate to creating an index of video segments based upon caption information.

U.S. Pat. Nos. 5,859,662, 7,467,398, 5,561,457 and U.S. Pub. Nos. 2007/0027844, 2008/0313146, 2009/0049481 and 2003/0093814 relate to viewing indexed video or audio based on caption searches.

U.S. Pat. Nos. 5,859,662, 5,481,296 relate to software for an end user for the related technology; and U.S. Pub. No. 2003/0192050 relates to software for broadcast location.

U.S. Pat. No. 6,457,010 relates to storing information about a user's profile.

U.S. Pat. No. 7,210,157 and U.S. Pub. Nos. 2007/0300250 and 2003/0221198 relate to allowing for finding media based on a user's profile.

In addition to the patent references listed hereinabove, it is known in the art to provide for free and licensed applications that allow individuals to record and extract CC of completed recordings. These applications are typically located at the end-user's premise, provide for a limited number of channel recordings and provide limited database and search capabilities. Most of these applications are aimed at providing traditional Personal Video Recording (PVR) functionality such as record this program at this time on this channel. Some allow for added features such as limited keyword searches of extracted captions and only of recordings in the format of the vendor of the TV tuner. All of them enable extraction after the broadcasts have been recorded and not while the broadcasts are in progress.

Open-Source close caption (CC) extraction applications include:

a) The SCC Tools package consists often command-line tools (and one General Parser module) designed to assist in the task of extracting, manipulating, and inserting the additional data included in Line 21 of NTSC video: closed captions, MSNTV links, V-Chip ratings, and a variety of lesser-used types of information. http://www.geocities.com/mcpoodle43/SCC_TOOLS/DOCS/SCC_TOOLS.HTML#CCExtract b) MPG2SRT—MPG2SRT is a standalone program to extract closed captioning data embedded within an MPEG2 file. The extracted captions can be saved in a .srt format for use with directvobsub or similar application, or as a .SAMI file for use with Windows Media Player. http://www.htpc-tools.com/mpg2srt/ c) http://ccextractor.sourceforge.net/ccextractor_for_windows.html

There are companies that provide (fee or free) PVR or DVR functionality software. All provide the basic and/or enhanced PVR or DVR capabilities and some provide extended capabilities. Some features include: pause, rewind, fast-forward live; record all favorite TV shows by name; and integrated TV guide (provided by the DVR software). Some companies providing commercially available products or services at the time of the present invention include:

a) Microsoft MediaCenter—allows for recording of selected channels at particular times and all of the traditional PVR functionality.

b) SnapStream Personal and Enterprise edition products are the most advanced. The products are able to capture, index and extract captions and alert users based on keywords. The application is aimed at an individual (personal device) or an organization and is bundled with its own hardware and software. A full description of the capability of the device is: http://www.snapstream.com/enterprise/features.asp.

c) ATI Multi-Media Center (http://ati.amd.com/products/multimediacenter/features.html) allows the user to record and search the Closed Caption text during TV-on-Demand™ sessions and is limited to the number of tuners in the user's system. Creation and delivery of alerts are limited.

d) SageTV (http://sagetv.com/stvfeatures.html?sageSub=tv) offers many features of an advanced PVR and DVR.

e) MythTV (www.mythtv.org) is a Free Open Source software digital video recorder (DVR) project distributed under the terms of the GNU GPL. It has been under heavy development since 2002, and now contains most features one would expect from a good DVR.

SUMMARY OF THE INVENTION

A first aspect of the present invention is to provide methods and systems to extract in real time or near real-time captions from Video broadcasts that have Closed Captions (CC), extract encoded near real-time advertisements, provide alerts based on keywords or concepts of interest, extract parts or entire audio from a video broadcast, search captions and enable users to index into the video or audio segments that are relevant to the captions, view or listen to the search results, assemble a 'personal' audio and video of the results into a personalized clip and run the environment in a distributed or centralized manner as a dedicated environment or a service environment. This capability can be in a general or dedicated device such as a PC or embedded in a device such as a TV tuner, PVR or DVR or any intelligent computing device, including SOC and mobile devices. Near real-time extraction is extraction that is initiated during the broadcast whereas real-time extraction has no time delay.

A second aspect of the present invention is to provide systems and methods to encode and embed a stream of bits that represent an Advertisement Tag Code (ATC) for providing automatic electronic methods for collecting data about at least one ATC and correlate collected data with additional sources of data. The ATC may be encrypted or un-encrypted. Benefits of methods and system of the present invention for applications in advertising include providing a campaign manager capabilities to monitor automatically and electronically the effectiveness of a particular advertising campaign, the occurrence of 'earned media' relevant to the campaign and to correlate such campaign with traditional print media, internet media, social media and mobile media campaigns. The ATC is placed in the VBI or closed captioned stream of a broadcast TV channel, or in a live Internet video stream.

While other systems exist for tagging advertisements such as Ad-ID, the present system and method provide for an open and widely available service that does not rely on a central authority to design and distribute the advertisement TAG for any content. For example, an ATC may be inserted into a data stream to enable users to automatically link to a company's web site for a particular product or particular campaign. Such an ATC would therefore facilitate the integration of any content from the live broadcast to any other content (web logs, web pages, phone logs, etc.) for the purpose of producing deeper analytics about the effectiveness of the message; whether it is ad campaign-related or otherwise.

These and other aspects of the present invention will become apparent to those skilled in the art after a reading of the following description of the preferred embodiment when considered with the drawings, as they support the claimed invention.

BRIEF DESCRIPTION OF THE DRAWINGS

FIG. 8 shows an interface for displaying query results in a time sequence.

DETAILED DESCRIPTION

Figure 1:
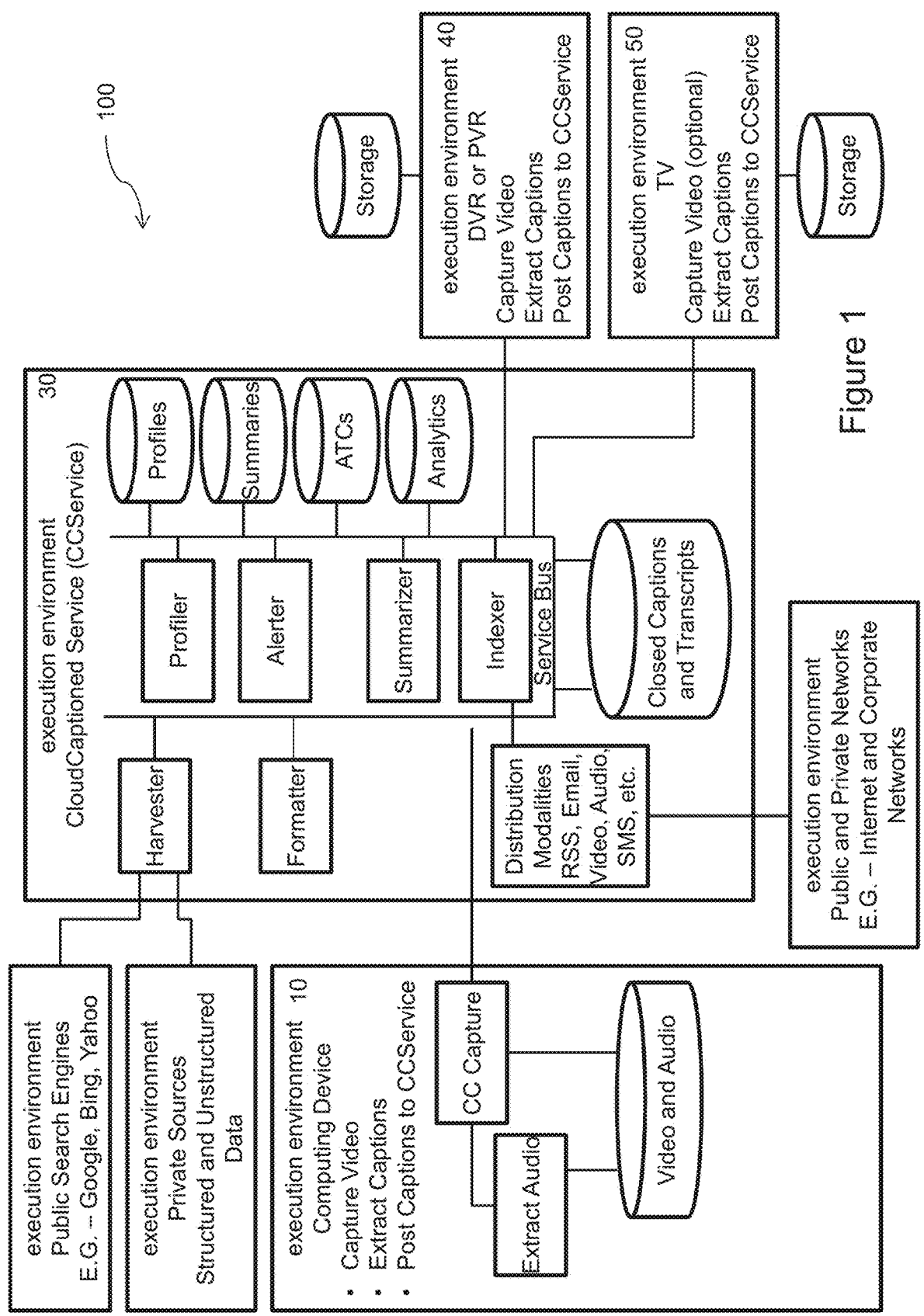
FIG. 1 illustrates a schematic view of one embodiment of the present invention.

Referring now to the drawings in general, the illustrations are for the purpose of describing a preferred embodiment of the invention and are not intended to limit the invention thereto.

Near Real-Time Extraction

The present invention also provides methods and systems for extracting near real-time captions from Video broadcasts that have Closed Captions (CC), extract in near real-time encoded advertisements or targeted content, provide alerts based on keywords or concepts of interest, extract parts or entire audio from a video broadcast, search captions and enable users to index into the video or audio segments that are relevant to the captions and run the environment in a distributed or centralized manner as a dedicated environment or a service environment.

The captions are extracted from any video and audio broadcast (TV or Internet) and inserted into a database that allows for alerting based on WOI, searching, indexing into video and audio segments and extraction of all or partial audio from the video broadcast. There is a limited amount of bandwidth available on mobile devices, and lower speed networked connection, and this invention will deliver to lower speed devices the alerts in increasing bandwidth via SMS messaging, email alerts, audio alerts, video alerts and any combination thereof with links back to any and all aspects of the WOI. Additionally, there are places and locations where streaming video is not appropriate, be it a bandwidth limitation or surroundings (e.g., meetings, formal occasions) would not make it socially acceptable or simply because listening and viewing may not be possible but reading would be perfectly normal and socially acceptable.

Embedded Software

The present invention further provides for a software program or System on a Chip (SOC) application that resides on a computational device at the end-user's home, or at the broadcaster's premise or at a shared facility or service—such as Amazon's C3 and S3 network ("Cloud")—that will monitor recorded TV programs, in progress TV programs, Internet based Videos and streaming videos and recordings and extract the closed captions (CC) on a configurable basis; e.g., every N seconds, minutes or hours. The captions are retained on the user's device, pushed to the Cloud (or any virtualized system), or pushed to one or more edge devices and/or a combination thereof. As used herein, a "server platform" refers to any device or combinations of devices, whether physical or virtual, operable to store data and perform the analytics recited herein.

Preferably, the systems and methods of the present invention to collect and configure a personal dossier or clip comprised of one or more fragments from the words of interest from the captions and the extracted and configured CC. In one embodiment, the method steps preferably include at least the following steps: extracting caption fragments from a broadcast; correctly sequencing the caption fragments by matching fragment overlaps; eliminating redundancies; assembling the caption fragments into a single transcript; thereby providing a more complete captions transcript from fragmented captions transcripts.

"Stitching" or assembling submitted video and/or audio segments from various channels based on user interest—WOI or concepts—into a single or multiple segments based on rules established by the application or the user in a personal dossier or clip and allowing users to browse the various assembled dossiers private or publicly shared.

Delivering the stitched video and/or audio segments to an un-tethered or tethered device such as phone, TV, PC, radio, etc. The segments can then be shared using one or more of the available sharing platforms such as iTunes, Twitter, Facebook, etc. in a public or private channel.

Enabling feedback and rating of a segment or group of segments for the purpose of ranking, augmenting or correcting the content by human or automated means.

Analyzing and providing real-time or near real-time feedback to the broadcaster or copyright owner of the content about usage, consumption and interest about the WOI or concepts being broadcast thereby enabling the content owner or broadcaster to better target various content to participating audiences.

Developing a SOC to accomplish the above and enabling it on PVRs, PCs, TVs, radios, phones and other electronic devices.

In a preferred embodiment, a software extension, SOC or plug-in (to a web browser or an application) is incorporated in an audio or audio-visual device or is provided through 'add-on' devices in networked Digital Video Recorders (DVR) or Personal Video Recorders (PVR) systems—such as TiVo, Windows MCE or any of the Cable or Telephony based network DVR and PVR systems, or a TV, mobile Telephone, standalone dedicated device, web browser or computer application. This extension would enable the user to extract the CC on a configurable basis; e.g., every n seconds, minutes or hours. The captions are retained on the user's end device, pushed into the Cloud, stored on one or more edge devices, and/or combinations thereof in order to leverage the additional enhanced features of the entire environment.

In one embodiment of the present invention, a software program extracts captions of various recording formats of various commercially available TV Tuners formats, such as Microsoft's, ATI's, SnapStream, SageTV, etc. TV tuners located in an end user's home, a cloud configuration, and/or or on one or more edge devices that tune the desired channels and record the programs of interest to the end-user. Thus, extraction occurs at the device level, at a server platform level, or on via any device connected to the device or the server platform. Tuners are available in many forms and tune un-encrypted and encrypted channels both in digital and non-digital formats, either in stand-alone mode or added to a standard PC interface. The present invention systems and methods further include at least one database that is capable of handling a large stream of incoming captions from multiple sources and segmenting the data access rights based on various parameters such as but not limited to: personal channels, licensed channels, free public channels, private channels, etc.

While there are both open source and licensed systems that deliver one or more aspects of this capability, none allow for a very large scale deployment (hundreds or thousands of channels from any source around the world in any language) in a distributed or centralized manner using the same components in a near real-time manner. All components of the application or service can run on a single system or many systems but appear as a single system or service.

Any Voice/Speech

The extraction of the captions would occur in for any transmission of voice or speech, including audio-only broadcasts such as radio-type over the air, on the Internet or any connected network broadcasts utilizing text to speech methods. The term "voice broadcast" is used herein to include any transmission, whether audio-visual or audio alone, that broadcast voice or speech, on any medium.

Advertisement Tag Code

The present invention provides systems and methods to encode and embed a stream of bits that represent an Advertisement Tag Code (ATC) for providing automatic electronic methods for collecting data about at least one ATC and correlate collected data with additional sources of data. Benefits of methods and system of the present invention for applications in advertising include providing a campaign manager capability to monitor automatically and electronically the effectiveness of a particular advertising campaign and to correlate such campaign with traditional print media and internet media, mobile media campaigns. The ATC is placed in the VBI or closed captioned stream of a broadcast TV channel, or in a live Internet video stream. The ATC need not be inserted in advertisements only, but in any type of broadcast such as a news broadcast or comedy shows. The ATC may be encrypted or un-encrypted, visible to the viewer (such as a QRcode or other code) or invisible the user but recognizable by the automated systems, such as unique images, patterns, and the like.

The systems and methods of the present invention include at least one advertisement tag code (ATC) for electronically marking an advertisement. Preferably, the ATC is provided at more than one point in the data stream for a video advertisement, including once at the beginning of an advertisement, or a begin tag, and also at the end of an advertisement, or an end tag. The ATC may be either 'open' or 'encrypted' and preferably includes an amount of information associated with predetermined factors, including anything that an advertiser or broadcaster wishes to capture including but not limited to an advertisement label, an intended advertisement market target, a demographic target, a television (TV) program, a time of advertisement, and a code, such as a general code or a proprietary code operable to link the advertisement to a promotional campaign that is correspondingly linked to the advertisement. A software application operable to collect data and generate the at least one tag, and for extracting the at least one tag, is provided within the system of the present invention. Preferably, an interactive website with graphical user interface is provided for systems and methods of the present invention to allow a multiplicity of users to register for a web-based service for providing methods for automated data stream ATC tagging. More particularly, registered users who have activated accounts via the interactive website platform indicate or select and describe at least one advertising campaign for monitoring.

Within the context of the system and methods of the present invention, an advertisement agency or entity creating the advertisement (advertising users) provide and include an encoded or un-encoded stream of bits (or tag) in the beginning and end of every advertisement using the closed captioned technologies available today. The ATC or tag code includes any desired information that the advertiser wishes to encapsulate in the data. For example: that the advertisement played on a particular region/channel/time slot/day/and that it played for a particular amount of time.

A set of TV tuners or computing devices (in the event the ATCs are being monitored on the Internet by computers) would be located in target locations that will tune into the desired channels that the product managers wish to monitor and record the programs continuously based on an algorithm that is driven by the central service where and in near real-time, harvest the coded messages and update a data base or repository, central or distributed, with the desired information.

Other Features

The software operable on the interactive web platform or software operable on a remote computer device further include algorithms in the cloud platform, on the end user's computing device, and/or on one or more edge devices that are operable for the following functions: capture the end user profile and preferences with regards to WOI, modality of alerts, summarization levels of the CC and system housekeeping such as retention of recorded videos and audios; format the incoming stream of captions to a more user friendly and human readable format in any of the CC languages—captions are not assumed to be English only— and to use various dictionaries to properly format proper names, places, currencies, etc.; alert the user based on any existing or future modality of interest such as mobile device, a computing device of any type, a browser plug-in, an RSS Reader of any type, a toolbar add-on to a browser of any kind or an operating system feature capable of accepting one or more of the above modalities.

The present invention system and methods further include an indexing capability that is capable of searching based on a variety of levels ranging from simple keywords, phrases, proximity of words, concepts, facets or ontological searches based on any publicly or privately available ontology; and a summarizer that is operable for summarizing the full transcript of captions from a specific recording or partial captions of a specific recording at a varying degree of summarization ranging from 1% to 99% of the text—with zero and 100 percent being no summary is necessary; a facility that is capable of detecting and accordingly handling duplicate entries (e.g., same broadcast exists but is being re-broadcast at a different time or different channel) into the database, 'garbage' (sometimes captions are garbled at the source and due to transmission issues), offensive words (defined by the service or the end user or both); a facility that is capable of standardizing and detecting recording times across national and international boundaries in order to be able to retrieve and present the correct results for queries into the CC database that will span multiple channels and multiple time-zones. This facility also allows the service or application to integrate and 'mash-up' such information with a query across all indexed information from commercial search engines such as Google, Yahoo and Bing, Twitter, FaceBook and the like. The facility that is able to extract a segment, or all of the audio of a TV recording, that matches the segment in the extracted CC where the WOI occurred. The audio or video segments can be in one or more popular formats (e.g., mp3, mpeg) and can be optionally (based on the user profile) combined into a single 'clip' or multiple 'clips', downloaded to a mobile device (e.g., iPhone or iPod Touch), integrated with a personal media library (e.g., iTunes), or retained at the end-user's premise, in the Cloud, or on one or more edge devices for future retrieval.

Furthermore, software of the present invention includes algorithms for generating analytics from the stored captions to answer questions such as: what is being recorded, what is being searched, what modalities of alerts users are choosing, 'hot topics' of the day, month or year, etc.; also, including algorithms operable for providing detailed information of advertisement placements in a TV or Internet broadcast and provide a capability to back to the advertisement sponsor to link the advertisement placement to the effectiveness of their promotion campaigns on TV, Internet and other promotion campaigns; and optionally including algorithms that enable comparison of competitive advertisement placement campaigns to answer questions such as, by way of example and not limitation: Where is Fidelity (or Schwab or E*Trade) advertising? What Shows? What Times? What Channels? How many? Preferably, the software also includes algorithms operable for detecting whether advertisements were 'clipped' or shortened is provided for verifying the length of the advertisement with the 'Begin' and End Tags of the advertisement ATC.

Regarding system operation and methods thereof, the present invention includes operating at a computing device of an end user for the following: installing a CC client software on the remote computing device of the end user; the software operable for automatically executing actions based upon selections input by the end user through input device(s) associated with the remote computing device, preferably via an interactive graphical user interface that is accessible via the web or other network; a cloud platform including a destination for captions, selectable or designatable by the end user; a database for storage of extracted captions, either in memory on the remote computing device, on the cloud platform, on removable memory device(s), on one or more edge devices, or other data storage device or system; wherein the software application runs or operates automatically as a background task on the remote computer device for always monitoring a recording folder for new recordings; and combinations of these functions and/or components.

Additionally or alternatively, the present invention provides for systems and methods operable from any networked device, providing for end user operation for the following: logon to a service or Internet site and register the KOI and alert preferences; browse alerts; search on KOI; display full, summary or clipping of transcript where the KOI occurred; and combinations thereof.

Regarding back-end service operation for systems and methods of the present invention, the following functions are provided for set-up: set-up for TV tuners; connect tuners to TV and Internet providers, in particular, as an option for centrally recorded channels; set-up for software and system components on a centralized or distributed group of computing and storage devices; set-up for network connectivity; and combinations thereof.

FIG. 1 illustrates a schematic of the present invention systems and methods, generally described as 100. The shaded parts of the diagram are external to the environment. Either a public or private network distribution mechanism is operable for the present invention. An execution computing device 10 is shown operable on a computer with TV tuners for functioning to capture video, extract & post captions to CC service 30, whether cloud caption or other service. The mechanism provides a TV tuner part of this environment, and a card inside a PC or tuner external to a PC, software monitors recordings, between about 10-30 seconds, and user configurable for any length of time, looks for new recordings, identifies recordings and captions corresponding thereto. Over time the software is able to delete recordings to conserve storage space. Once posted to the cloud or virtualized system, then the CC service components are orchestrated to store, search, alerted, summarize, etc. The link does not need to be an Internet link, since the entire system can be deployed in one box or in a distributed manner across many systems.

Once at the cloud level or virtualized system, the system includes an arrangement that is distributed on one or more machines to scale. A collector captures the CC (not shown) and saves in a database. A service bus allows any system component to communicate and interact with any other component in the system or service, e.g., summarizer can look for what is complete, alerter looks for profiles from users, and posts to alerting distribution module, etc., after confirming that it meets client profile, then provides a notice to client about what is recorded from shows or advertisements or other video being monitored. In this embodiment, the search capability is built into the database but can be a separate index engine that resides either locally or another host even external to the entire service and is constantly indexing the database for new information. A formatter (raw text captions come in all uppercase with an average of 5-6 words per line, prior art) attempts to format what is being said, so that it provides a more human readable text in free-form format. The harvester's role is for targeting companies, e.g., interested in product advertising, to respond or answer the question of "who else is saying anything at this time related to this product?" The system and methods of the present invention operate to harvest all data being said or communicated on the WOI, and link the data to the point of interest (e.g., search engine results, social media sites and the like to determine if product being mentioned anywhere else, public or private resources). Significantly, the systems and methods of the present invention provide for automated analysis of the data including the WOI, wherein the analysis includes linking the target mention results to other social media and digital media target mention results. More preferably, the analysis and automated linking of the target mention results to social media is applied for a predetermined time period. In this manner, correlation of the impact or value of the target mention results to response by an audience within a predetermined time and/or geography is provided. Thus, the present invention provides social monitoring and assessment of target mention results, for example in advertising or promotion of goods or services; a graphical user interface or dashboard display may be provided to facilitate comparisons and metrics for the analysis between the data including the WOI and the social media activity and/or response. By way of example and not limitation, social media includes web-based sites for groups, such as Facebook, Twitter, and combinations thereof. Metrics are generated by the cloud-based analysis of the data to determine how people relate to the target mention results, such as for example with advertising, in particular the analysis and metrics review related tweets or twitter feeds and Facebook or social media text-based commentary with respect to time and content that was broadcast. Advantageously, since all CC are time-stamped and date-stamped, the systems and methods provide for real-time analysis. Harvesting twitter feeds or tweets and retweets with respect to a content or a subject or WOI provides for analysis of distribution over time, data, and count (such as the number of tweets, retweets, etc. or social media mention).

The ATCs analytics database is including tags or currently captioned commercials, to allow the analytics engine to determine how many times a company is advertising on a specific channel, time, which company is advertising on what stations and show, etc. A capability of the analytics and alerting feature is to monitor, for example, if an ad is mentioned and a product manager is interested in knowing a potential impact of the ad with an analysis of web site traffic, links to the company's website, links to social media sites and analyze data to establish any correlation between who is acting on the information being advertised. Preferably, the data is collected at the start of an advertising campaign and analysis used to determine the effectiveness of the advertising campaign based upon the social media activity correlating in time with the WOI or target mention results. Additionally, a comparison with similar WOI in connection with competitive businesses may be provided with the analysis. Also, in the case of Twitter or tweet analysis, retweets may be weighted over original tweets since they amplify the impact or message propagation through that social media data. An automated survey application may be further included for additional data to be used with the social media data to consider impact of the advertisement, WOI, and/or target mention results.

Social media platforms (e.g., Twitter, Facebook, Instagram, Snapchat, etc.) are a primary source of information for many users in recent years. Social media tags on these social media platforms have helped to build communities of engaging discussion around particular news, events, persons, memes, topics, opinions, ideologies, etc. in the forms of hashtag (e.g., # topic), @symbol, and the like.

For example, to help build a conversation around a subject, Twitter users link their tweets to the subject by using hashtags. Hashtags can be searched easily within social media sites to find out how many people have been discussing a certain subject, how many times a certain subject has been discussed, and/or if the discussion is positive or negative over a predetermined time and/or geographic area.

As the discussion grows and evolves, different hashtags can be used in relation to a subject. The meaning of some hashtags may not be obvious given only the hashtag. The systems and methods of the present invention can identify all the hashtags related to a subject or words of interest, and provide for analysis including correlating hashtag discussions with target mention results in audio/video content sources. In one embodiment, the present invention provides intelligence to business owners in advertising or promotion of goods or services. In another embodiment, the present invention provides insights of the impact and/or influence of certain social and/or political events in a certain time period and/or geographic area.

In one embodiment, the present invention is operable to create a quick survey based on captions and tags extracted from a video and/or audio source, and solicit customer feedback via either a TV or a mobile device. In one embodiment, TVs are operable for interactive viewing. A listener and/or viewer can click and select a tag in the closed captions shown on a TV screen during a program to participate in a survey. The survey through tags during a program captures relevant content, interest and demographics, and is more accurate and informative.

The surveys can be as simple or complex as the host desires. In one embodiment, the survey is in an audio form. A podcast creator inserts a tag (e.g., # survey) into the recording platform and creates a survey that the podcast creator knows his listeners will not mind taking, for example a three-question survey. Upon reaching the tag, the podcast player alerts the listener to a survey being present. The listener may choose to pause the podcast to participate or continue listening and not participate in the survey. If the listener chooses to participate in the survey, the device connects to the appropriate survey and serves the user either a textual or verbal survey. Upon completion of the survey, the podcast creator now has direct feedback about specific questions regarding his or her survey. In another embodiment, the survey is in a text form. If the podcast's captions are being read on an electronic device, the user may click on the tag "# survey" to participate in the survey as if the user clicked on a hyperlinked "# survey." The link contains all the information needed to serve the right survey to the particular podcast. In another embodiment, the survey is embedded in closed captions of a video. In the case of a hearing-impaired individual, the viewer will see the # survey and may pause the podcast or video and participate in the survey.

In one embodiment, the present invention provides fact check for media reports based on extracted captions from various news broadcast. It is assumed that news broadcasters vet their reports a lot more than fake news writers. If a news story is reported by multiple stations, it is given a higher probability of truthiness than one that are not. In one embodiment, the present invention provides an automated rating of trustfulness to a news story based on corroboration of multiple independent reputable and trusted sources including verifying timeline, prior stories, etc.

In one embodiment, the present invention extracts captions automatically from specific podcasts a user is interested in, and suggests similar podcasts that have the same hosts or similar concepts being discussed. Links of similar podcasts are provided and subscription of thereof are promoted. For example, a listener or a viewer has an interest in current events and is listening to or reading captions extracted from a real-time feed or archived feed. Key concepts in the real-time feed or archived feed analyzed by the back-end platform include US-EU relationships, President Trump's comments on NATO and the EU, Donald Tusk's comments about Vice Present Pence's commitment to International Order, security and the EU, and Vice President Pence's assured commitments to EU and NATO on his recent visit. The back-end platform then suggests similar podcasts or captions from known sources (e.g., television, radio, internet, newspapers) based on the listener's interest and key concepts from the current episode, and serves up additional content that is likely to be of interest to the listener. For example, the back-end platform is operable to recommend published books by a guest on the subject at hand, recommend additional podcasts or hosts where the guest was also featured, and provide links to other podcasts that address current events (e.g., from the Council on Foreign Relations, BBC, PBS Newshour, PRI's The World, etc.).

In one embodiment, the present invention provides automatic translation for a script shown in a foreign language on a video source into a language that a user prefers (for example, his/her native language, or a langue he/she understands), and displays the translated script on a user device (for example, TVs, smart phones, and other portable devices with a display screen). For example, a protest sign written in a foreign language in a news broadcast is automatically translated into a viewer's native language. In one embodiment, the translated script stream is in sync with the video stream and the extracted caption stream. In another embodiment, the translated script is embedded into the extracted caption stream.

The present invention preferably functions and is operable in a DVR 40 and/or TV environment 50, as well as any computing device operable for video functions and capable of processing the embedded captions in a video broadcast.

Figure 2:
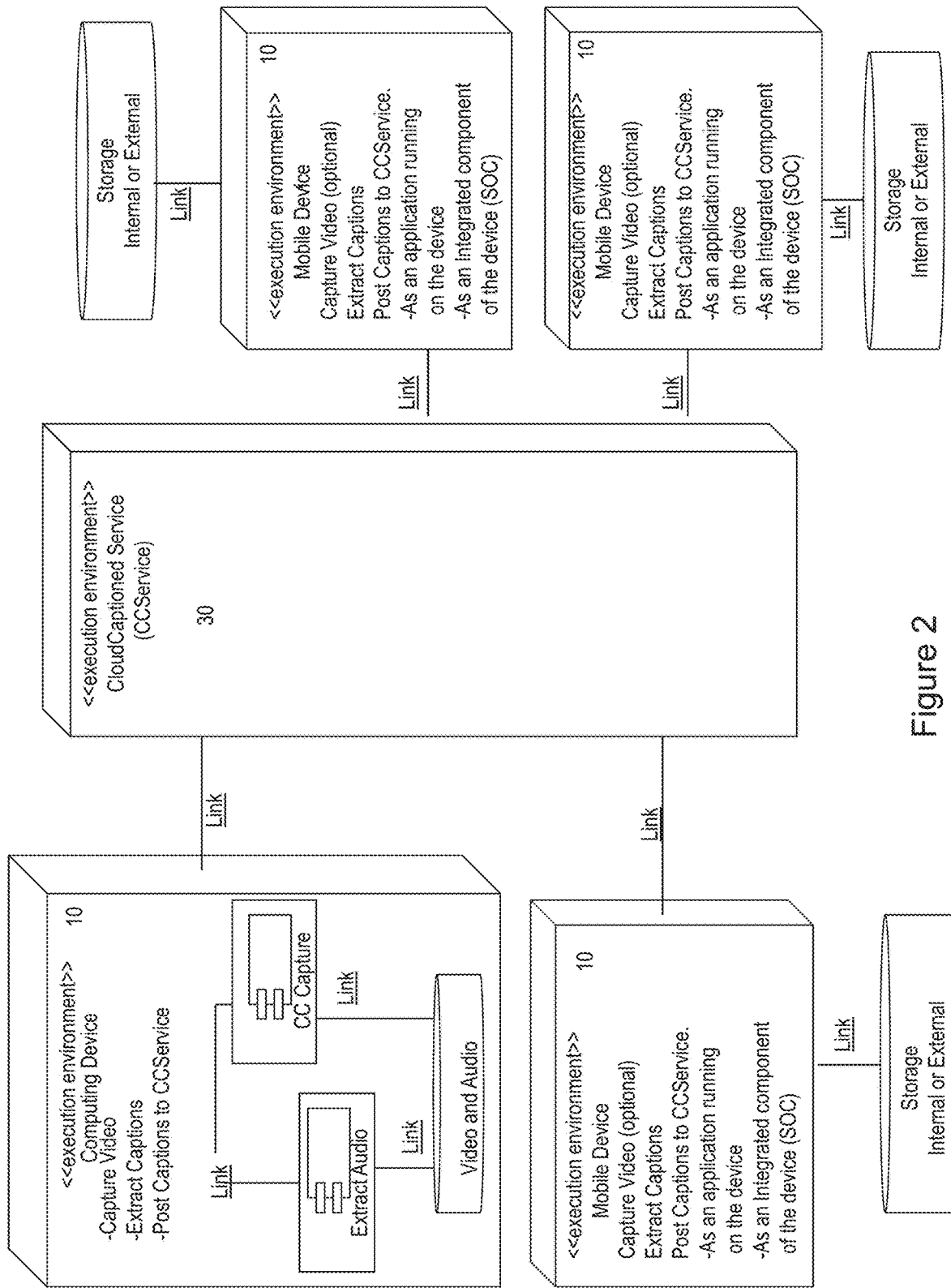
FIG. 2 illustrates a schematic view of another embodiment of the present invention.

FIG. 2 is another schematic of an example embodiment of the present invention, demonstrating four local machines 10, including mobile local machines, capturing and extracting captions and posting the extracted captions to a CloudCaptioned Service operating in a computing cloud.

In a preferred embodiment of the present invention, every part of a transcript is stored in the database. An email is forwarded to each subscriber according to the preferences for monitoring established by the subscriber and authorized by the system. Data is retained in a database to enable additional deeper analytics for the purpose of business intelligence and creating decision support systems The functions available remotely by the subscribers include: to browse and search transcripts; including delimiters such as, by way of example and not limitation, the date range, any words, all words, exact phrase, etc. as illustrated in the screen shot of FIG. 3. Preferably, the system provides access for the subscriber to review, preview, or see clippings or portions of transcripts, or entire transcripts. A search can pull the sample where the search text occurs embedded in the captions. It can expand the content in portions, including some additional data, but not full transcript, or the entire transcript. As set forth herein, the subscriber registers with the system to subscribe to keywords to monitor, and receives an alert when it occurs; preferably, then a portion is provided, more than the alert; and then the option to see the full transcript if entitled, and pay the content owner, as appropriate.

The systems and methods of the present invention also provide for a tag database for advertisements, to include sounds, not just words. E.g., Aflac advertisement might include "aflaaaac" the sound and not simply the words. Such capability enables the execution environment to recognize intended advertisements or special tags without captions being present in the broadcast. Then the system monitors shows or advertisement on every show where the subscriber or advertisers advertises and at what time the advertisement occurs. A preview of the subscription to show results is provided automatically.

Also, preferably, an option under the graphical user interface of the interactive website portal provides the option for selecting an output format as a spreadsheet for date, time, network, and show, which allows a subscriber to quickly create macros for analytics to pivot around data. Additionally, as set forth hereinabove, the output format may further include a dashboard or other GUI for presenting the data as well as analysis thereof, including linking to live or archived social media content from the likes of Facebook or Twitter.

Thus, the present invention includes a method for finding and accessing desired audio content from audio content sources. The method steps include providing a server with a processing unit, the server is constructed, configured and coupled to enable communication over a network; the server provides for user interconnection with the server over the network using a computing device positioned remotely from the server; the server and personal computer running non-transitory computer-readable storage media with executable programs stored thereon; the personal computer monitoring a broadcast, the broadcast being any voice broadcast; the executable programs extracting captions from a broadcast in near real-time; aggregating the captions in a database; indexing the database content; searching the captions for a mention of at least one target text, herein termed a target mention; analyzing the results for desired content; indexing into the database to extract the desired content; thereby providing a method for quickly finding and accessing desired audio content from a large number of sources.

The method preferably further includes a local machine running a non-transitory computer-readable storage medium with an executable program stored thereon; the executable programs extracting the captions. The captions can be aggregated in one location or in a cloud computing system. The local machine's executable programs can be a system on a chip application.

The method further includes analyses for determining the earned media and paid media of the at least one target and categorizing the at least one target mentions into positive, negative, neutral and unknown categories. The target mention results can be linked to other social media and digital media target mention results, and therefore provide for social monitoring through social media usage. Preferably, the retrieved captions are retrieved from media selected from the group consisting of audio and/or video media.

Another method according to the present invention is a method for managing communication through mass media; the method steps include monitoring for target mentions; categorizing the target mentions into positive, negative, neutral and unknown categories; linking the target mentions in real-time to determine whether such mentions trigger a spike in social media; visualizing the results and analyzing for trends; responding to the media with interest with measured response based on the results; measuring the impact of the response; thereby managing communication through mass media to increase mentions of a target. The mass media communication can be managed for different purposes, including public relations and brand management.

A method for preventing invalid captions from being submitted to a closed caption database includes the method steps of authorizing and authenticating linked devices; extracting captions from authenticated linked devices; thus preventing the submission of captions that are not part of the broadcast. These method steps include at least the steps of: authorizing devices, authenticating linked devices; extracting captions from authenticated linked devices; and preventing the submission of captions that are not part of the broadcast. Security and authentication are provided by private keys, shared keys, steganography and other methods including a secret code that the server sends to each device, which code must be included with any uploaded caption segment, and combinations thereof.

A method for extracting complete captions from fragmented audio or video captions includes the steps of extracting caption fragments from a broadcast; correctly sequencing the caption fragments by matching fragment overlaps; eliminating redundancies; assembling the caption fragments into a single transcript; thereby providing a more complete captions transcript from fragmented captions transcripts.

A system for extracting audio captions according to the present invention thus includes a server with a processing unit, a database, and a local machine tuned to at least one broadcast; the server constructed, configured and coupled to enable communication over a network; the server and database and the server and local machine interconnected over the network; the server and local machine running non-transitory computer-readable storage media with executable programs stored thereon; the executable programs of the local machine extracting captions from the broadcast and transmitting them to the server; the server executable programs storing, indexing and retrieving the captions in and from the database; thereby providing a system for local extraction of audio captions from a broadcast.

In one embodiment, the system and method of the present invention are built on a distributed and decentralized platform. In one embodiment, the decentralized platform is a peer-to-peer platform with distributed ledger technology. The peer-to-peer platform is operable to extract captions from various audio and video sources and record the extracted captions on a blockchain. Social media data and analyzed data also recorded on the blockchain. In one embodiment, the blockchain-based platform also provides cryptocurrency to facilitate survey rewards and other relevant transactions.

FIGS. 3-12 illustrate screen shots of various graphical user interfaces for an interactive website according to one embodiment of the present invention. The various screen shots of website graphical user interfaces show options for selecting search or browse transcripts, search all words/any words/exact phrase, date range, shows to search, etc. Importantly, with the present invention systems and methods, it is provided for functionality to automatically link between real time advertising on TV and then exploring web-based searching that follows within a predetermined time. This provides for analytics that consider marketing and advertising conversion from viewers to searching online within a predetermined timeframe after it is shown on TV.

Figure 3:
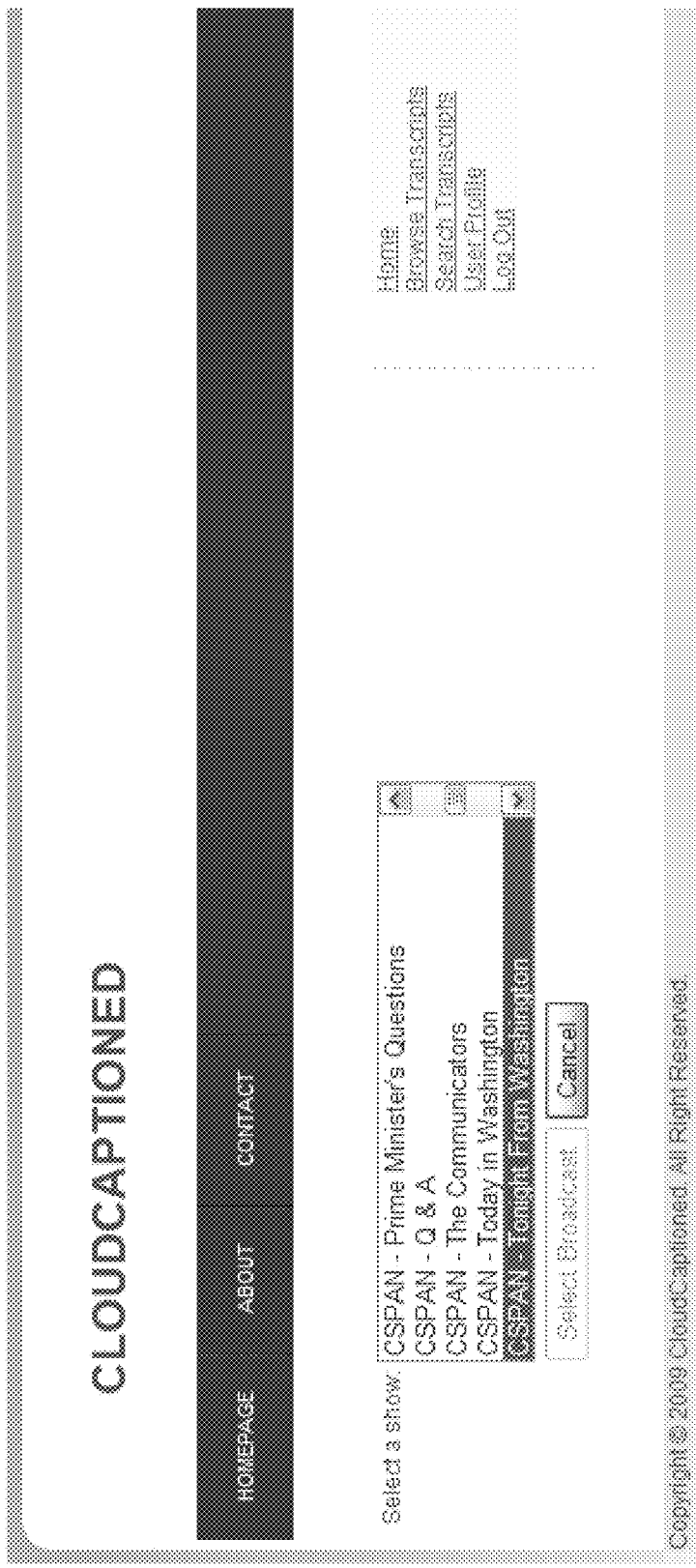
FIG. 3 shows an interface for retrieving captions for a specific show.
Figure 4:
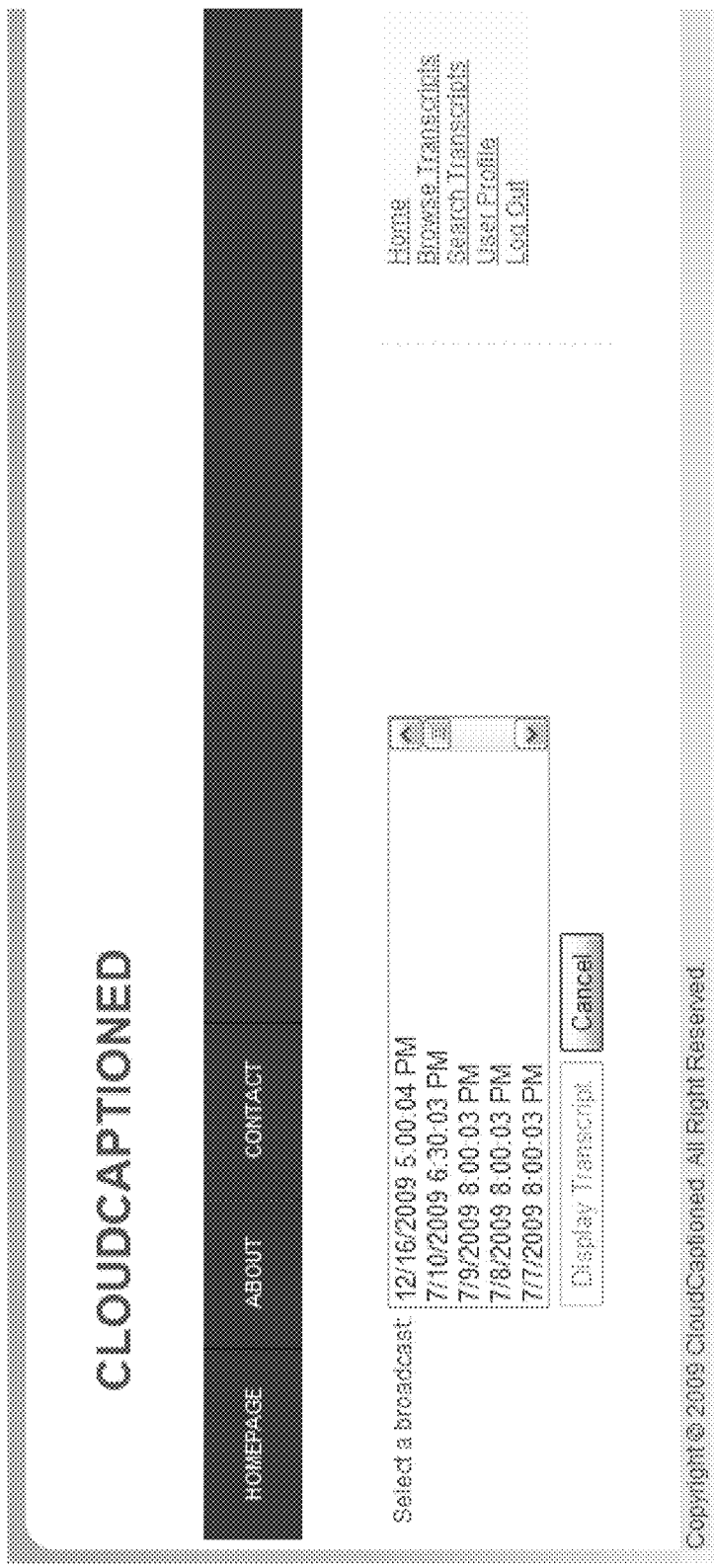
FIG. 4 shows an interface for retrieving captions for a specific date and time for the show selected in FIG. 3.
Figure 5:
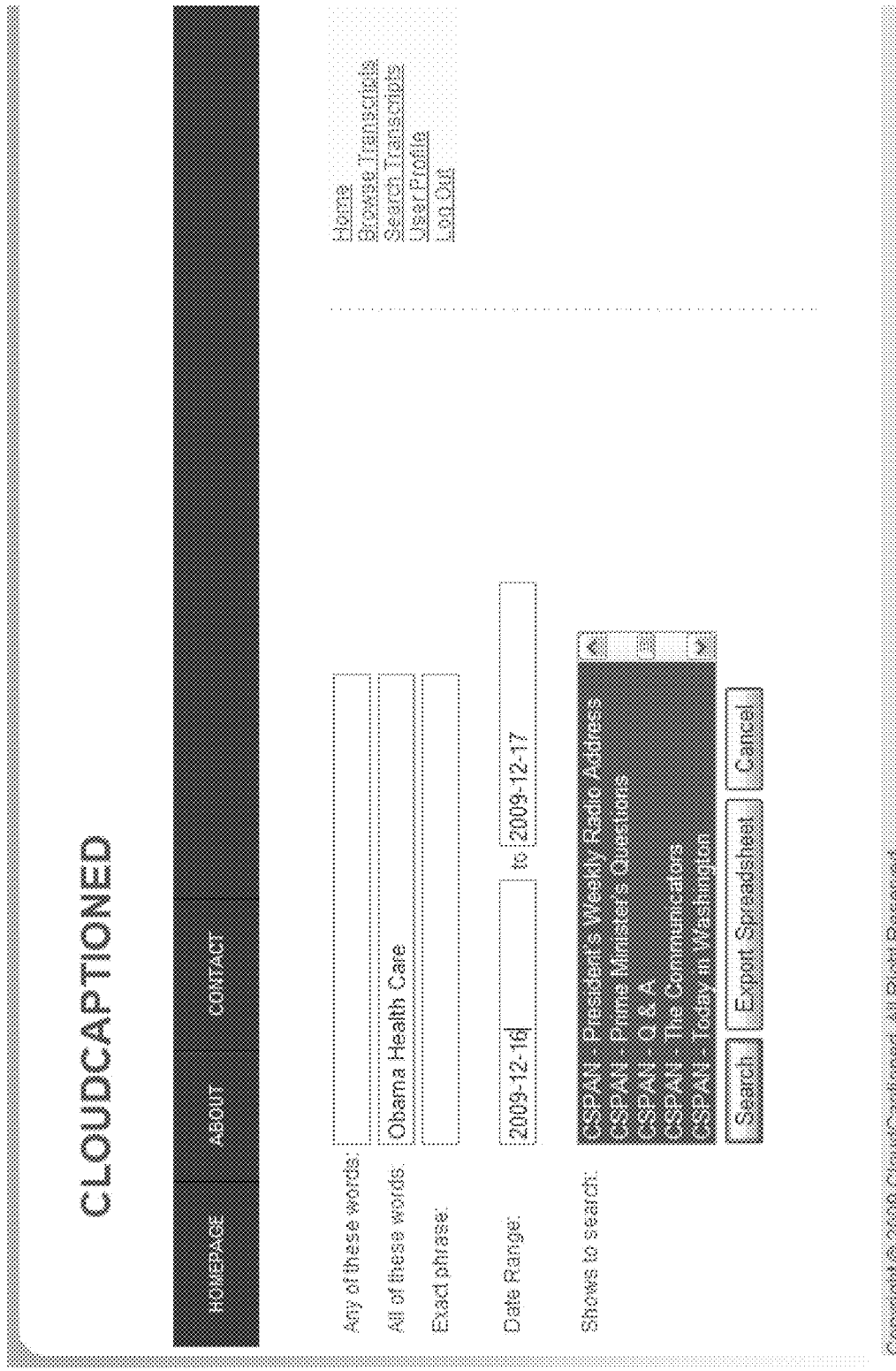
FIG. 5 shows an interface for searching shows.
Figure 6:
FIG. 6 shows an interface for displaying query results.
Figure 7:
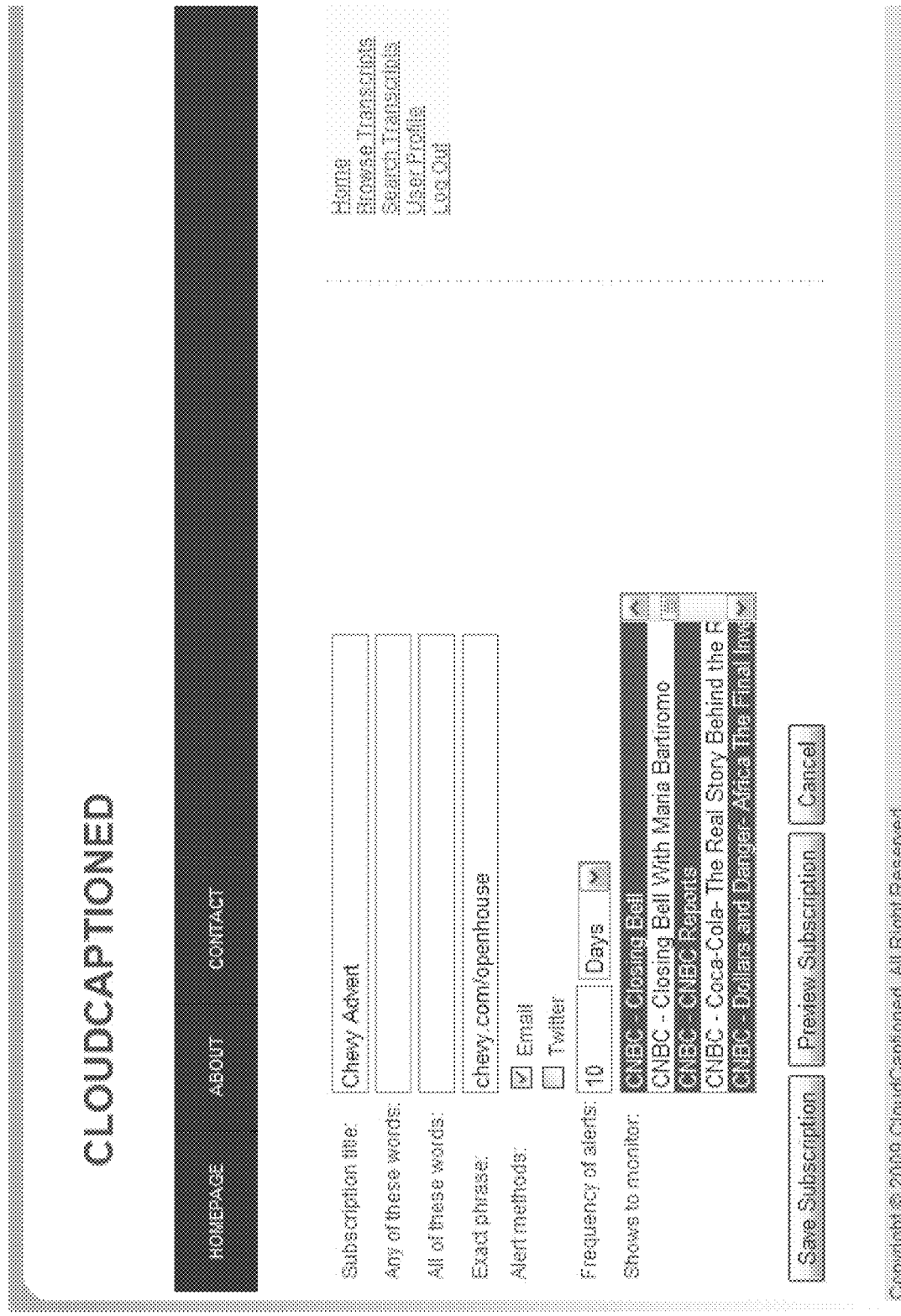
FIG. 7 shows an interface for searching for advertisements subscriptions.
Figure 8:
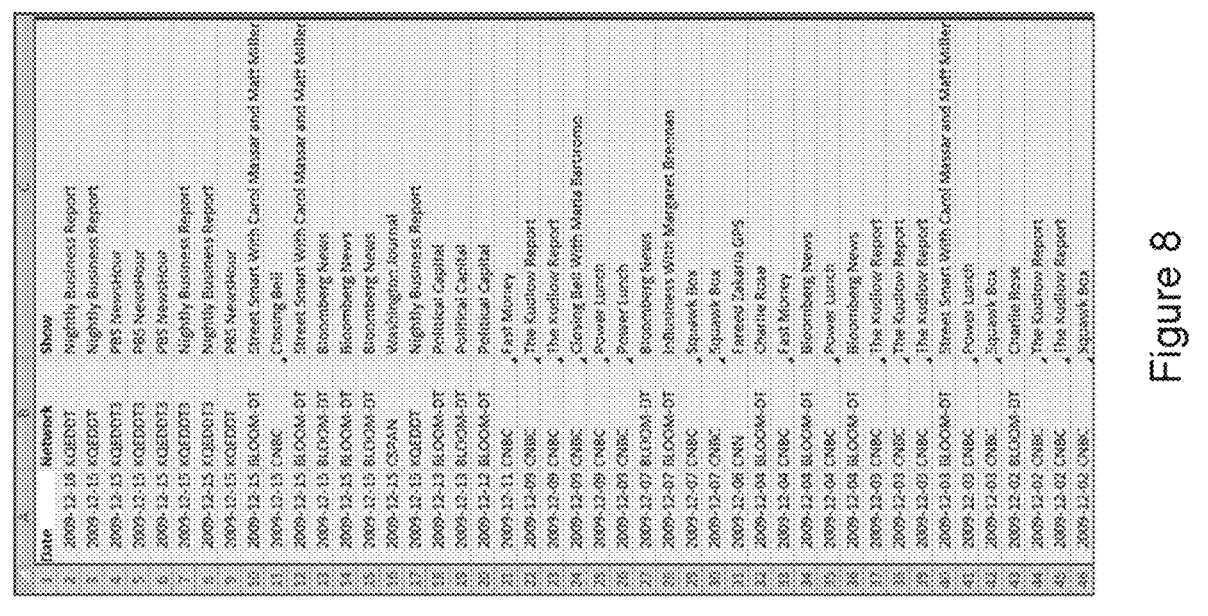
Figure 9:
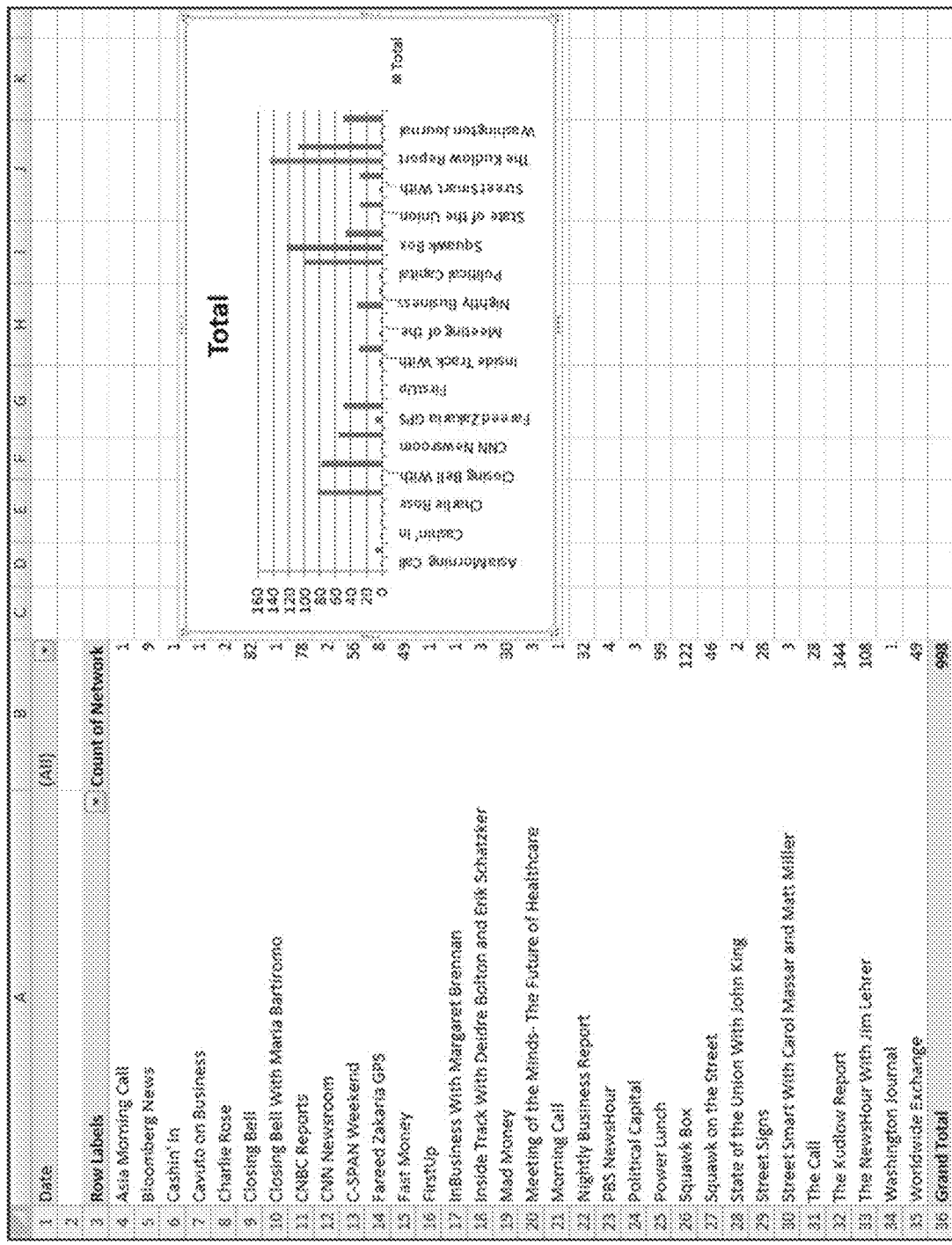
FIG. 9 shows an interface for displaying query results by show with count, including a graph display.
Figure 10:
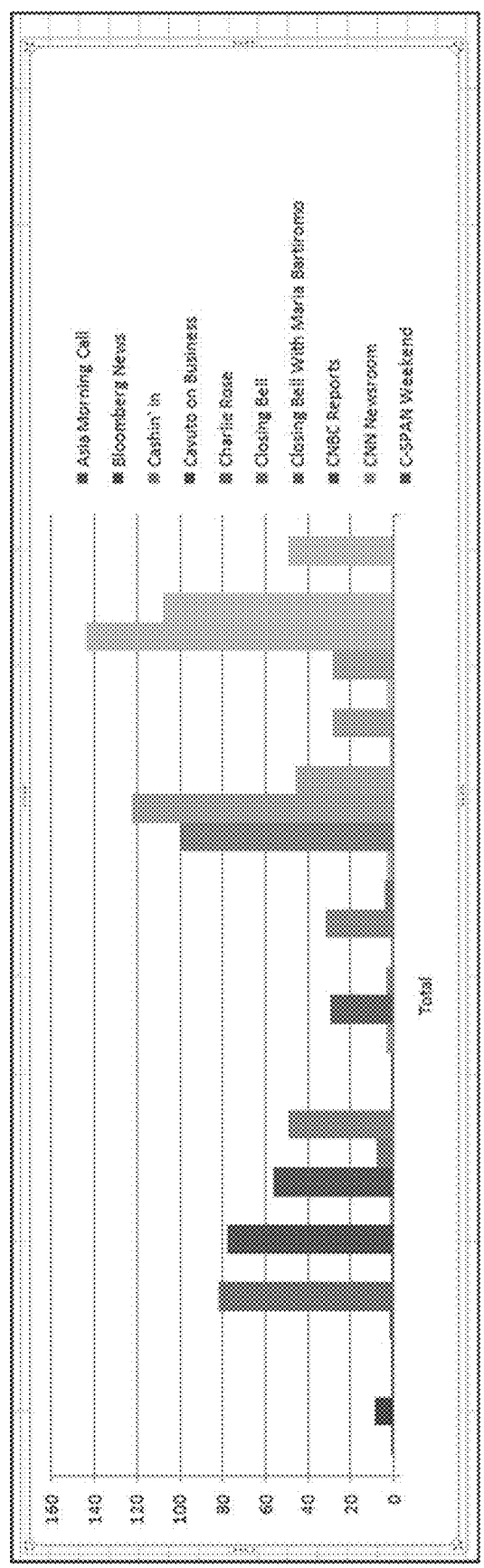
FIG. 10 is the graph of FIG. 9, enlarged for better visibility of details.
Figure 11:
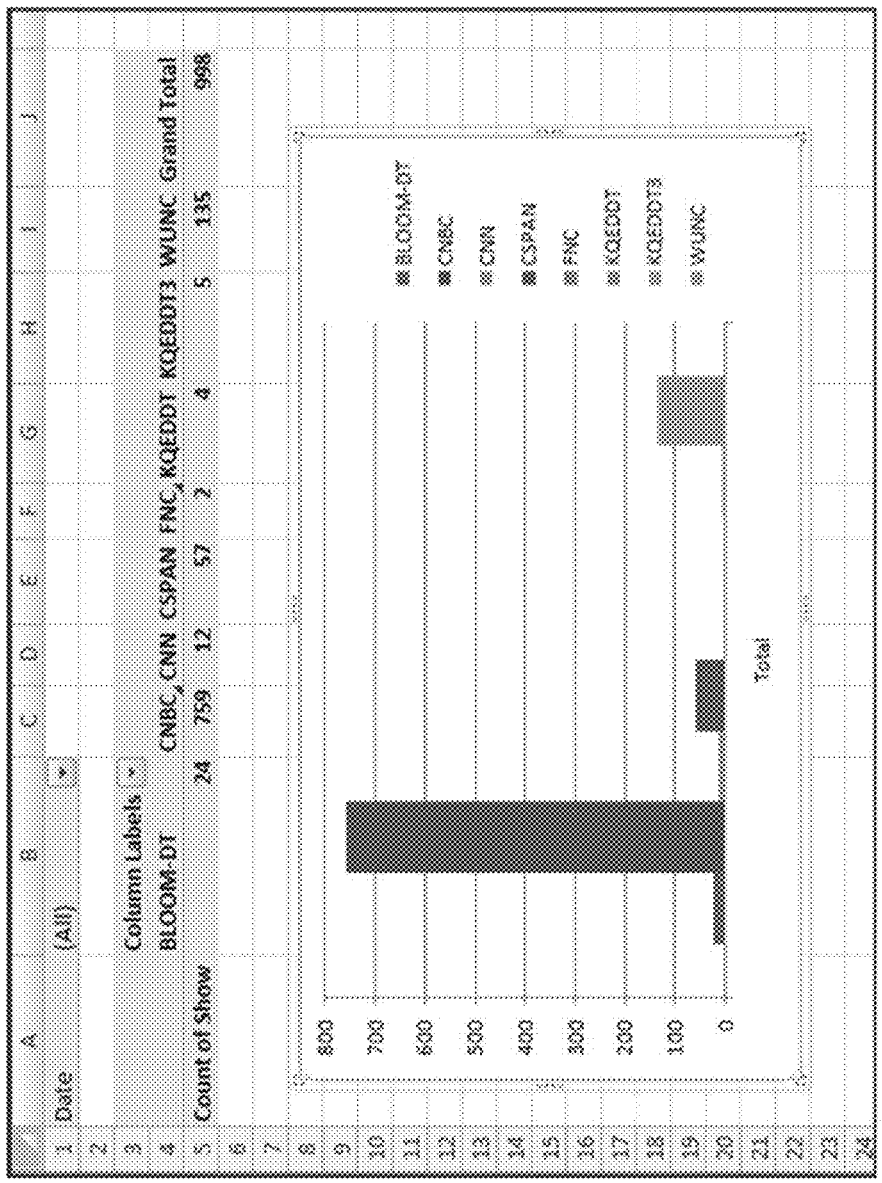
FIG. 11 is an interface for displaying query results with a table and graph showing query hits and count according to channel.
Figure 12:
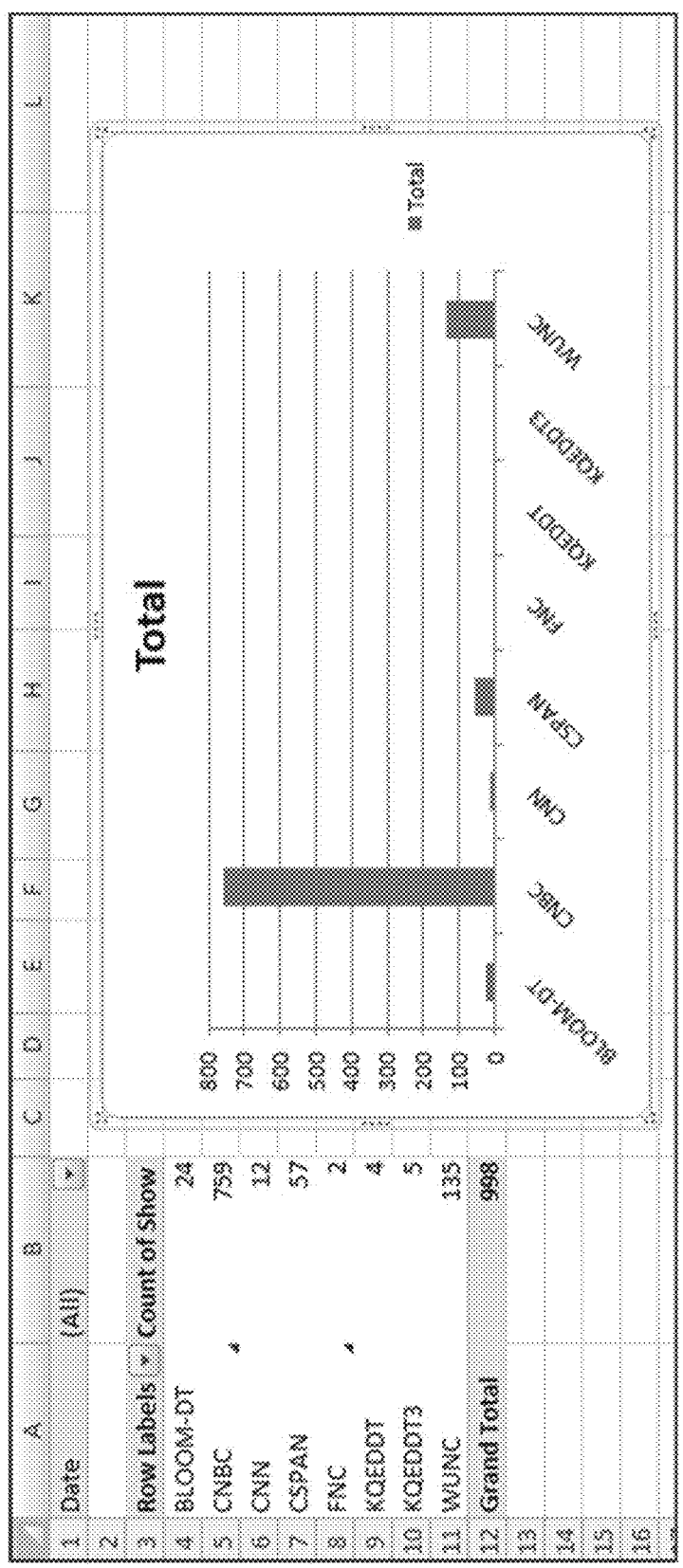
FIG. 12 is another table and graph showing query hits and count according to channel.

FIG. 3 shows an interface for retrieving captions for a specific show. FIG. 4 shows an interface for retrieving captions for a specific date and time for the show selected in FIG. 3. FIG. 5 shows an interface for searching shows. FIG. 6 shows the results of the query of FIG. 5. FIG. 7 shows an interface for searching for advertisements subscriptions. FIG. 8 shows the results of the query for FIG. 7, displayed in a time sequence. FIG. 9 shows the results of the query of FIG. 7, displayed by show with count, including a graph display. FIG. 10 is the graph of FIG. 9, enlarge for better visibility of details. FIG. 11 is a table and graph showing query hits and count according to channel for the search of FIG. 7. FIG. 12 is another table and graph showing query hits and count according to channel for the search of FIG. 7.

Certain modifications and improvements will occur to those skilled in the art upon a reading of the foregoing description. By way of example and not limitation, in addition to words of interest (WOI) or keywords, the present invention systems and methods include consideration of concepts associated with WOI, i.e., the concepts are considered as a context within keywords or WOI but not identical to the WOI. For example if a person is interested in conflict situations in the Middle East, a user may only specify "Middle East conflict" as WOI but the system will be capable of understanding the concept of Middle East conflict and will include fragments that discuss conflict in all the countries in the Middle East (Israel, Lebanon, Iraq, Iran, Egypt, Jordan and Syria and non-core participants such as US, Turkey, and many other countries) without the user explicitly specifying all the countries as specific WOI. The above-mentioned examples are provided to serve the purpose of clarifying the aspects of the invention and it will be apparent to one skilled in the art that they do not serve to limit the scope of the invention. All modifications and improvements have been deleted herein for the sake of conciseness and readability but are properly within the scope of the present invention.

The invention claimed is:

1. A system for targeted content analysis, comprising:
a server platform constructed and configured for network communication with at least one device;
wherein the at least one device is operable to receive a live broadcast and/or stream audio or video content;
wherein the at least one device and/or the server platform is operable to extract captions of speech or voice from the live broadcast and/or the audio or video content in real time or near real time;
wherein the server platform is operable to automatically translate a foreign language script from an image displayed in a video into the selected language;
wherein the server platform is operable to display a caption stream on a display device, wherein the caption stream includes the extracted captions and the translated foreign language script from the image displayed in the video; and
wherein the server platform is operable to search the extracted captions for at least one keyword relating to targeted content, thereby creating search result data, and calculate an impact of the targeted content by correlating the search result data with data obtained from the Internet;
wherein the server platform is operable to provide real-time feedback to a broadcaster of the live broadcast about usage of the at least one keyword on social media;
wherein the server platform is operable to provide real-time analysis of social media engagement metrics from text-based commentary for broadcast content; and
wherein the live broadcast and/or the audio or video content includes a media report, and wherein the server platform is operable to determine an automated rating of trustfulness of the media report in real time or near real time as content is transmitted to the at least one device, based on comparisons of content of the extracted captions to one or more independent external sources; and
wherein the automated rating of trustfulness is based on a verification of the timeline associated with the content.

2. The system of claim 1, wherein the data obtained from the Internet includes social media data.

3. The system of claim 1, wherein the data obtained from the Internet includes web site traffic.

4. The system of claim 1, wherein the server platform includes a peer-to-peer platform.

5. The system of claim 1, wherein the server platform and/or the at least one device is operable to extract segments of the live broadcast and/or the audio or video content based on the at least one keyword relating to targeted content.

6. The system of claim 1, further comprising a summarizer operable to provide a summary of the live broadcast and/or the audio or video content based on the extracted captions.

7. A system for targeted content analysis, comprising:
a server platform constructed and configured for network communication with at least one device;
wherein the at least one device is operable to receive a live broadcast and/or stream audio or video content;
wherein the at least one device and/or the server platform is operable to extract captions of the live broadcast and/or the audio or video content;
wherein the at least one device and/or the server platform is operable to add an advertisement tag code (ATC) including a plurality of information associated with the extracted captions, the live broadcast, and/or the audio or video content; and
wherein the live broadcast and/or the audio or video content includes a media report, and wherein the server platform is operable to determine an automated rating of trustfulness of the media report in real time or near real time as content is transmitted to the at least one device, based on comparisons of content of the extracted captions to one or more independent external sources, wherein the content includes a verified timeline associated with the content.

8. The system of claim 7, wherein the server platform is operable to search the extracted captions for at least one keyword, thereby creating search result data, and calculate an impact of the targeted content by correlating the search result data with data obtained from the Internet.

9. The system of claim 7, wherein the server platform is operable to generate an alert based on at least one keyword, wherein the alert includes or links to an identification of the live broadcast and/or the audio or video content.

10. The system of claim 7, wherein the server platform is operable to extract segments of the live broadcast and/or the audio or video content based on at least one keyword relating to the targeted content.

11. The system of claim 7, further comprising a summarizer operable to provide a summary of the live broadcast and/or the audio or video content based on the extracted captions.

12. A system for targeted content analysis, comprising:
a server platform constructed and configured for network communication with at least one device;
wherein the at least one device is operable to receive a live broadcast;
wherein the at least one device and/or the server platform is operable to extract captions of the live broadcast;
wherein the at least one device and/or the server platform is operable to search the extracted captions for a targeted content based on user profile and preferences;
wherein the at least one device and/or the server platform is operable to generate an alert based on the targeted content;
wherein the live broadcast includes a media report, and wherein the server platform is operable to determine an automated rating of trustfulness of the media report, based on comparisons of content of the extracted captions to one or more external sources;
wherein the server platform is operable to provide real-time feedback to a broadcaster of the live broadcast about usage of at least one keyword of the targeted content on social media;

wherein the server platform is operable to provide real-time analysis of social media engagement metrics from text-based commentary for broadcast content; and wherein the live broadcast and/or the audio or video content includes a media report, and wherein the server platform is operable to determine an automated rating of trustfulness of the media report as content is transmitted to the at least one device, based on comparisons of content of the extracted captions to one or more independent external sources, wherein the content includes a verified timeline associated with the content.

13. The system of claim 12, wherein the server platform includes a distributed and decentralized platform on a blockchain, and wherein the extracted captions are recorded on the blockchain.

14. The system of claim 12, wherein the server platform and/or the at least one device is operable to extract segments of the live broadcast transmitted to at least one device based on at least one keyword relating to the targeted content.

15. The system of claim 12, wherein the server platform is operable to generate at least one advertisement tag code (ATC), mark the live broadcast with the at least one ATC, and extract audio or video segments from the live broadcast transmitted to at least one device.

16. The system of claim 12, wherein the server platform is operable to calculate an impact of the targeted content by correlating the search result data with data obtained from the Internet.

17. The system of claim 16, wherein the data obtained from the Internet includes social media data.

18. The system of claim 7, wherein the server platform is operable to automatically translate the live broadcast content.

19. The system of claim 12, wherein the server platform is operable to assemble segments of the live broadcast transmitted to at least one device and segments of other audio content or other video content into a single segment.

20. The system of claim 1, wherein the server platform is configured to receive feedback for and a rating of a segment or a group of segments of the audio content or the video content via social media.

* * * * *